United States Patent [19]

Honda et al.

[11] 4,085,262

[45] Apr. 18, 1978

[54] PROCESS FOR PRODUCING A HIGH POLYMERIC SUBSTANCE HAVING ISOCYANATE GROUP

[75] Inventors: Toshio Honda, Akigawa; Itsuo Tanuma, Tokorozawa; Shoji Tanaka, Higashi-Yamato; Koichi Iwami, Kunitachi; Yukio Fukuura, Kodaira; Shoson Shibata, Tokyo; Yoshikatsu Suzuki, Higashi-Murayama, all of Japan

[73] Assignee: Bridgestone Tire Company Limited, Kyobashi, Japan

[21] Appl. No.: 737,825

[22] Filed: Nov. 1, 1976

[30] Foreign Application Priority Data

Oct. 31, 1975   Japan ................................. 50-130525

[51] Int. Cl.$^2$ ............................ C08F 8/42; C08F 8/30
[52] U.S. Cl. .................... 526/46; 260/680 B; 526/52; 526/180; 526/182; 526/213; 526/216
[58] Field of Search ................... 526/46, 52, 180, 182, 526/213, 216; 260/680 B

[56] References Cited

U.S. PATENT DOCUMENTS

| 3,402,136 | 9/1968 | Sakuragi et al. ...................... 526/46 |
| 3,483,175 | 12/1969 | Harper et al. .......................... 526/46 |

FOREIGN PATENT DOCUMENTS 45-13,591   5/1970   Japan ..................................... 526/46

*Primary Examiner*—William F. Hamrock
*Attorney, Agent, or Firm*—Sughrue, Rothwell, Mion, Zinn and Macpeak

[57] ABSTRACT

A high polymeric substance having isocyanate group is produced by reacting a liquid high polymeric substance containing carbon-to-carbon unsaturated double bond or a solution of said high polymeric substance with a cyanate, an alkyl hypohalite and an organic carboxylic acid.

14 Claims, 1 Drawing Figure

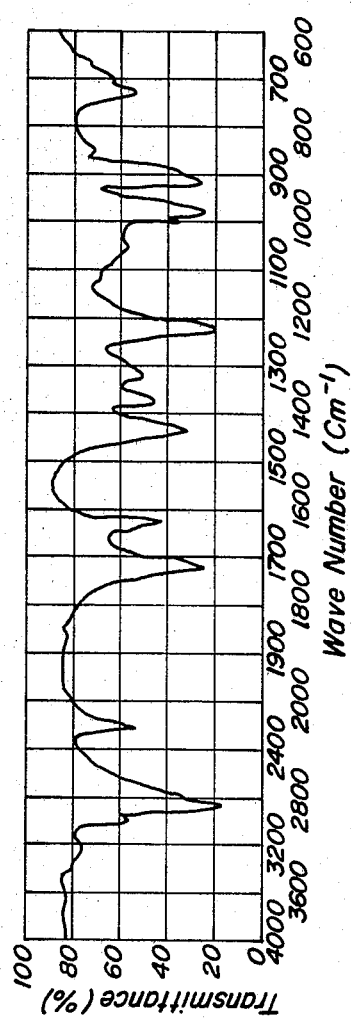

PROCESS FOR PRODUCING A HIGH POLYMERIC SUBSTANCE HAVING ISOCYANATE GROUP

BACKGROUND OF THE INVENTION (1) Field of the Invention

The present invention relates to a novel process for producing a high polymeric substance having isocyanate group, which comprises introducing isocyanate group into a high polymeric substance containing carbon-to-carbon unsaturated double bond.

(2) Description of the Prior Art

Recently, many trials in order to obtain the polymer having pertinent properties to the use purpose in many technical fields have been actively made by modifying the well known high polymer.

As the methods for developing novel high polymers by modifying well known high polymers, graft and block copolymerization, polymer blending and the formation of derivatives by a chemical reaction to a raw polymer material have been hitherto effected.

As these examples of the latter case, the addition reactions of carboxylic acid, sulfonic acid, phosphoric acid, arsenic acid, phenol or alcohol to the high polymeric substance containing carbon-to-carbon double bond in the presence of alkyl hypohalite are well known [C. F. Irwin and G. F. Hennion, J. Amer. Chem. Soc. 63 858 (1941), D. E. Winkler and G. W. Hearne, J. Org. Chem. 25 1835 (1960)].

However, there is no disclosure on these literatures of the reaction introducing isocyanate group into a high polymeric substance.

On the other hand, the inventors have already found an effective process for introducing isocyanate group into the high polymeric substance at room temperature which comprises reacting the dioxane solution of iodine isocyanate with the high polymeric substance containing carbon-to-carbon double bond. However, this method is disadvantageous in manufacturing cost because iodine isocyanate to be used is prepared by reacting silver cyanate with iodine and is too expensive.

SUMMARY OF THE INVENTION

According to the present invention, there is provided a novel process for producing a high polymeric substance having isocyanate group, which comprises reacting a liquid high polymeric substance containing carbon-to-carbon unsaturated double bond or a solution of said high polymeric substance with a cyanate, an alkyl hypohalite and an organic carboxylic acid.

It is, therefore, an object of the present invention to provide a novel process for introducing isocyanate group directly into a liquid high polymeric substance containing carbon-to-carbon unsaturated double bond or a solution of said high polymeric substance. It is another object of the present invention to provide an effective and inexpensive process for introducing isocyanate group into a high polymeric substance containing carbon-to-carbon unsaturated double bond.

The high polymeric substance having isocyanate group according to the present invention is highly reactive and is easily cross-linked with addition of a well known cross-linking agent, such as polyol or polyamine, so that said substance can be applied for many industrial uses as raw materials, such as adhesive, sealant, caulking agent, paint and so on.

BRIEF DESCRIPTION OF THE DRAWING

The drawing shows the infrared absorption spectrum of the liquid polymer having isocyanate group obtained in Example 1.

DESCRIPTION OF THE PREFERRED EMBODIMENTS

The high polymeric substances containing carbon-to-carbon unsaturated double bond to be used in the present invention include wide varieties of high polymeric substances containing carbon-to-carbon unsaturated double bond in their molecule, such as natural rubber, polyisoprene, polybutadiene, polychloroprene, butadiene-styrene copolymer, vinylpyridine-butadiene-styrene copolymer, isobutylene-isoprene copolymer, acrylic acid-butadiene copolymer, methacrylic acid-butadiene copolymer, methyl acrylate-butadiene copolymer, methyl methacrylate-butadiene copolymer, ethylene-propylene-cyclopentadiene copolymer, ethylene-propylene-5-ethylidene-2-norbornene copolymer and ethylene-propylene-1,4-hexadiene copolymer.

Polybutene having terminal unsaturated double bond also may be used in the present invention.

The molecular weight of the high polymeric substances is not limited, however, it is preferable to use ones having molecular weight of more than 500.

Said high polymeric substances are usually used in a solution form dissolved in a suitable solvent, however, when said high polymeric substances themselves are liquid or viscous, it is matter of course that these polymeric substances can be directly subjected to the reaction.

As the solvents to be used in the present invention, ones which have a high solubility for said high polymeric substance and can stably dissolve the alkyl hypohalite are selected, and these solvents may be used alone or as a mixture thereof.

As such solvents, mention may be made of aliphatic hydrocarbons, such as hexane, heptane, cyclohexane; aromatic hydrocarbons, such as, benzene, nitrobenzene, halogenated benzene, toluene, xylene; linear or cyclic ethers, such as dioxane, diethylether, tetrahydrofuran; halogenated hydrocarbons, such as carbon tetrachloride, chloroform, dichloromethane; esters, such as ethyl acetate, methyl acetate; ketones, such as, methyl ethyl ketone, acetone, methyl isobutyl ketone, cyclohexanone, preferably toluene, tetrahydrofuran and acetone.

The cyanates to be used in the present invention are usually potassium cyanate and sodium cyanate. These cyanates are ordinarily used as an aqueous solution, but the cyanates may be used by dispersing the powdery cyanate in the liquid high polymeric substance or the solution of the high polymeric substance. An amount of the cyanate to be used in the present invention is in the range of from 0.05 to 0.5 mole, preferably from 0.1 to 0.3 mole, based on 1 mole equivalent of carbon-to-carbon unsaturated double bond contained in said high polymeric substance.

The alkyl hypohalites to be used in the present invention include primary alkyl hypohalites, secondary alkyl hypohalites and tertiary alkyl hypohalites. Among them, the tertiary alkyl hypohalites are stable and preferable and are, for example, tertiary butyl hypochlorite, tertiary butyl hypobromite and tertiary amyl hypochlorite.

An amount of these alkyl hypohalites to be used is in the range of from 0.1 to 0.6 mole, preferably from 0.2 to 0.4 mole, based on 1.0 mole equivalent of carbon-to-carbon unsaturated double bond contained in the high polymeric substance.

As the organic carboxylic acid to be used in the present invention, there may be used any organic compounds having one or more carboxyl groups.

Typical organic carboxylic acids to be used in the present invention are aliphatic carboxylic acids, such as formic acid, acetic acid, propionic acid, lactic acid, stearic acid, malonic acid, succinic acid, adipic acid, maleic acid and their derivatives; cyclic carboxylic acids, such as benzoic acid, phenoxyacetic acid, trimellitic anhydride, naphthenic acid, phthalic acid and their derivatives.

Among them, there may be preferably used formic acid, acetic acid, succinic acid, adipic acid, benzoic acid.

In the present invention, the object cannot be attained by using an acid other than an organic carboxylic acid as described above, such as hydrochloric acid, sulfuric acid, boric acid or p-toluenesulfonic acid.

When the organic carboxylic acids are solid, a solution dissolved in a suitable solvent is added dropwise, or said acids may be used in the solid state.

An amount of the organic carboxylic acids to be used in the present invention is in the range of from 0.4 to 1.2 mole, preferably from 0.5 to 1.0 mole, based on 1 mole equivalent of carbon-to-carbon unsaturated double bond contained in the high polymeric substance.

In the present invention, the kinds and the amounts of the high polymeric substance having carbon-to-carbon unsaturated double bond, the cyanate, the alkyl hypohalite and the organic carboxylic acid are as described above and the most effective result is obtained by using each component at the mole ratio of the cyanate/the alkyl hypohalite/the organic carboxylic acid to be 1/2/5.

The reaction temperature is not a rather important factor to accomplish the present invention, however, the range of the temperature of from −40° C to 30° C, preferably from −10° C to 10° C, is ordinarily applied in view of the stability of the resulting product.

As one embodiment of the process for introducing the isocyanate group into the high polymeric substance having carbon-to-carbon unsaturated double bond, the following procedure is conducted.

At first, said high polymeric substance is dissolved in a suitable solvent and then an aqueous solution of the cyanate and the alkyl hypohalite are added thereto and then the organic carboxylic acid is added dropwise to the mixture with stirring.

As described above, by adding finally the organic carboxylic acid, the preferable result is obtained.

The reaction is completed within a few minutes after adding the organic carboxylic acid to the reaction system, when the pale yellow colour due to the alkyl hypohalite disappears.

After washing the resulting product with a large quantity of water, petroleum ether, acetone and the like are added to precipitate the purified high polymeric substance having isocyanate group. As one application of the product, it can be utilized for the preparation of amine functional polymer by substituting the isocyanate group with an amine group through the reaction with an excess of diamine and conventional purification procedures, such as precipitation in a non-solvent, evaporation of the solvent and freeze-drying.

EXAMPLE 1

An aqueous solution of 1.86 g (0.023 mole) of potassium cyanate KOCN dissolved in 10 g of distilled water was added dropwise to 10 g of liquid polybutadiene (trade mark; R45HT, made by ARCO Chemical Co., number average molecular weight; 2,500) dissolved in 50 g of toluene and the mixture was vigorously stirred. Then, 5 g of t-butyl hypochlorite (0.046 mole) was added and after the resulting mixture was cooled to 0° C by means of ice bath, 7 g of acetic acid (0.11 mole) was added dropwise thereto. After addition of acetic acid, the reaction product was washed with a large quantity of water.

The object product of the upper layer was taken out and added with ethanol to precipitate the object polymer. The resulting polymer was dissolved in tetrahydrofuran (THF) and then THF was evaporated to obtain the colourless, transparent liquid polymer.

The structure of the resulting polymer was determined by infrared analysis. The polymer was coated on a plate of a rock salt and subjected to measure by infrared spectroscopic method. The infrared absorption spectrum showed the large characteristic band at about 2,250 cm$^{-1}$ assigned to antisymmetric vibration of N=C=O group (cf. FIG. 1).

On the other hand, the resulting polymer was gelled after a few minutes by adding a small amount of a THF solution of hexamethylene diamine. The gelled polymer was subjected to measure by the infrared spectroscopic method. From the infrared absorption spectrum obtained, it was found that the characteristic band at 2,250 cm$^{-1}$ disappeared.

Accordingly, it was concluded that the isocyanate group was introduced into the liquid polybutadiene (R45HT) according to the present example.

EXAMPLE 2

The reaction was conducted in the same manner as described in Example 1 except for use of 13.6 g of succinic acid (0.115 mole), 26 g of benzoic acid (0.115 mole) or 5.3 g of formic acid (0.115 mole) instead of acetic acid and the liquid polymers were obtained respectively. (When the acid was solid, said acid was dissolved in toluene.)

The infrared absorption spectra of these polymers showed the large characteristic band at 2,250 cm$^{-1}$ assigned to antisymmetric vibration of N=C=O group, respectively.

However, when the reaction was conducted with use of p-toluene sulfonic acid, hydrochloric acid, sulfuric acid or boric acid instead of acetic acid, the resulting polymer did not show the characteristic band at 2,250 cm$^{-1}$ in the infrared absorption spectrum in each case.

EXAMPLE 3

The reaction was conducted in the same manner as described in Example 1 except for use of 10 g of cis-1,4-polybutadiene (trade mark; BR 01, made by Japan Synthetic Rubber Co., the mole equivalent of the double bond; 0.185 mole) dissolved in 150 g of toluene to obtain a polymer.

A film was prepared from the resulting polymer and subjected to measure by infrared spectroscopic method. The infrared absorption spectrum showed a large characteristic band at 2,250 cm$^{-1}$ assigned to antisymmetric vibration of N=C=O group. To a toluene solution of the resulting polymer was added a small amount of hexamethylenediamine and from the mixture a film was prepared. The formed film was not dissolved in toluene and from infrared analysis of the film, the characteristic band at 2,250 cm$^{-1}$ was not observed in its spectrum.

From these results, it was concluded that the isocyanate group was introduced into the polybutadiene (BR 01) of the raw material.

EXAMPLE 4

As the high polymeric substance having carbon-to-carbon unsaturated double bond, 10 g of natural rubber (the mole equivalent of double bond; 0.147 mole) and 10 g of styrene-butadiene copolymer (trade mark; SBR 1500, made by Japan Synthetic Rubber Co., styrene content; 23.5%, the mole equivalent of the double bond; 0.142 mole) were dissolved in 150 g of heptane respectively. Then, an aqueous solution of 1.5 g (0.023 mole) of sodium cyanate NaOCN dissolved in 10 g of distilled water was added to each of the above polymer solutions and the resulting mixture was vigorously stirred. Thereafter, 5 g of t-tutyl hypochlorite (0.046 mole) was added thereto.

The mixture was cooled to 0° C in an ice bath and then 7 g of acetic acid (0.11 mole) was added dropwise thereto. The resulting reaction mixture was washed with a large quantity of water. The polymer solution of the upper layer was taken out and a large quantity of acetone was added to the polymer solution to precipitate the polymer. The product was then dissolved in heptane and the solution was coated on a plate of rock salt as a specimen of infrared analysis.

The infrared absorption spectrum showed a characteristic band at 2,250 cm$^{-1}$ assigned to —NCO group. When a small amount of hexamethylenediamine was added to the solution and after a few minutes the gelled polymer was obtained.

Accordingly, it was concluded that the isocyanate group was introduced into the chain of the raw materials (NR and SBR).

What is claimed is:

1. A process for producing a high polymeric substance having isocyanate group which comprises:
   1. adding potassium or sodium cyanate, and an alkyl hypohalite to a liquid high polymeric substance containing carbon to carbon unsaturated double bond or a solution of said high polymeric substance; and
   2. subsequently adding an organic carboxylic acid to the resulting mixture, and reacting the resulting mixture; wherein the amount of said cyanate, said alkyl hypohalite and said organic carboxylic acid, based on one mole of the double bond of said high polymeric substance is 0.05 to 0.5 mole, 0.1 to 0.6 mole and 0.4 to 1.2 mole, respectively.

2. A process as claimed in claim 1, wherein the amount of the cyanate to be used is in the range of from 0.1 to 0.3 mole.

3. A process as claimed in claim 1, wherein the amount of the alkyl hypohalite is in the range of from 0.2 to 0.4 mole.

4. A process as claimed in claim 1, wherein the alkyl hypohalite is tert-alkyl hypohalite.

5. A process as claimed in claim 4, wherein the tert-alkyl hypohalite is at least one selected from the group consisting of tert-butyl hypochlorite, tert-butyl hypobromite and tert-amyl hypochlorite.

6. A process as claimed in claim 1, wherein the amount of the organic carboxylic acid to be used is in the range of from 0.5 to 1.0 mole.

7. A process as claimed in claim 1, wherein the organic carboxylic acid is at least one selected from the group consisting of aliphatic carboxylic acid and cyclic carboxylic acid.

8. A process as claimed in claim 7, wherein the aliphatic carboxylic acid is at least one selected from the group consisting of formic acid, acetic acid, propionic acid, butyric acid, stearic acid, malonic acid, succinic acid, adipic acid, maleic acid and their derivatives.

9. A process as claimed in claim 7, wherein the cyclic acid is at least one selected from the group consisting of benzoic acid, phenoxyacetic acid, trimellitic anhydride, naphthenic acid, phthalic acid and their derivatives.

10. A process as claimed in claim 1, wherein the reaction temperature is in the range of from —40° to 30° C.

11. A process as claimed in claim 10, wherein the reaction temperature is in the range of from —10° to 10° C.

12. The process as claimed in claim 1 wherein said liquid high polymeric substance per se is utilized.

13. A process as claimed in claim 1, wherein said solution of said high polymeric substance is utilized.

14. The process as claimed in claim 11 wherein the mole ratio of the cyanate/the alkyl hypohalite/the organic carboxylic acid is 1/2/5.

* * * * *